United States Patent
Ha-Duong et al.

(10) Patent No.: US 6,246,686 B1
(45) Date of Patent: Jun. 12, 2001

(54) METHOD FOR ASSOCIATING DATA WITH ATM CELLS

(75) Inventors: Tuan Ha-Duong, Antony; Mark Bassham, Bourg la Reine, both of (FR)

(73) Assignee: Fihem (FR)

( * ) Notice: Subject to any disclaimer, the term of this patent is extended or adjusted under 35 U.S.C. 154(b) by 0 days.

(21) Appl. No.: 09/017,507

(22) Filed: Feb. 2, 1998

(30) Foreign Application Priority Data

Feb. 4, 1997 (FR) .................................................. 97 01222

(51) Int. Cl.$^7$ .......................... H04L 12/28; G06F 12/10; H03M 13/00
(52) U.S. Cl. .......................... 370/395; 370/252; 711/216; 714/781
(58) Field of Search ................................... 370/392, 395, 370/397, 399, 389, 396, 400, 401, 409, 252; 714/774, 776, 781, 758, 759; 711/216–221

(56) References Cited

U.S. PATENT DOCUMENTS

| | | | |
|---|---|---|---|
| 5,345,451 | * | 9/1994 | Uriu ...................................... 714/758 |
| 5,479,401 | * | 12/1995 | Bitz ...................................... 370/397 |
| 5,530,806 | * | 6/1996 | Condon ................................ 370/397 |
| 5,699,369 | * | 12/1997 | Guha ................................... 714/774 |
| 5,867,509 | * | 2/1999 | Tanaka ................................ 714/758 |
| 5,905,728 | * | 3/1999 | Han ...................................... 370/395 |
| 5,912,881 | * | 6/1999 | Glaise .................................. 370/389 |
| 5,912,892 | * | 6/1999 | Barnhart .............................. 370/397 |
| 6,044,077 | * | 3/2000 | Luijten ................................ 370/392 |
| 6,046,996 | * | 4/2000 | Hoshino .............................. 370/392 |
| 6,122,279 | * | 9/2000 | Milway ................................ 370/395 |

FOREIGN PATENT DOCUMENTS 0 600 683   6/1994   (EP) .

OTHER PUBLICATIONS

Raj Jain: "A Comparison of Hashing Schemes for Address Lookup in Computer Networks" IEEE Transactions on Communications, vol. 40, No. 10, Oct. 1992, pp. 1570–1573.

Knuth: "The Art of Computer Programming", vol. 3, Addison–Wesley 1973, pp. 506–542.

* cited by examiner

*Primary Examiner*—Wellington Chin
*Assistant Examiner*—Steven Nguyen
(74) *Attorney, Agent, or Firm*—Piper Marbury Rudnick & Wolfe

(57) ABSTRACT

When establishing a virtual connection, a pair of identifiers VPI-VCI of $L_p+L_c$ bits is adopted, and data (Id_Cx) relating to said virtual connection is stored in a table in relation to its identifier pair. At the arrival of each ATM cell whose header includes the identifier pair of one of the virtual connections, the data relating to said virtual connection is read from the table. The table includes p.$2^m$ storage areas organized as $2^m$ rows and p columns. The data relating to a virtual connection are stored in an area of the table whose row is labelled by an m-bit index calculated by applying a systematic cyclic code, having a generating polynomial of degree m, to a binary word extracted from a sequence of $L_p+L_c$ bits which consists of the bits of one of the identifiers arranged in order of decreasing significance, followed by the bits of the other identifier arranged in order of increasing significance.

9 Claims, 3 Drawing Sheets

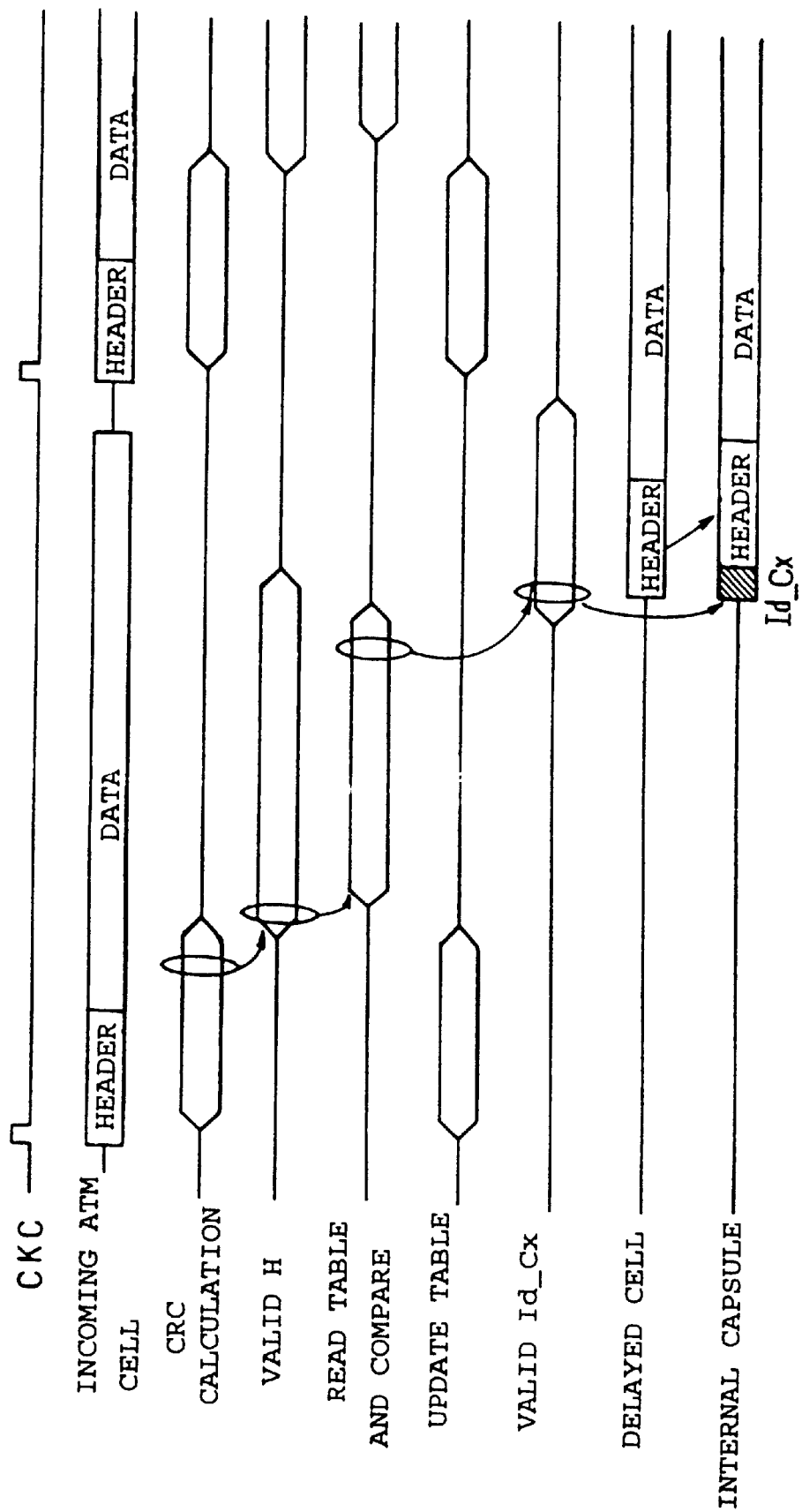

METHOD FOR ASSOCIATING DATA WITH ATM CELLS

BACKGROUND OF THE INVENTION

The present invention relates to a process for associating data with ATM cells reaching an item of ATM network equipment via virtual connections.

It is known that in ATM ("asynchronous transfer mode") technology, virtual connections are established between the items of equipment attached to the network, within the physical links which exist between these items of equipment. Each virtual connection is designated by a pair of identifiers which are retrieved from specified fields of the header of each cell transmitted over this virtual connection:

a virtual path identifier, or VPI, which generally designates resources allocated in a semi-permanent manner;

a virtual channel identifier, or VCI, which designates resources allocated dynamically within the virtual paths.

The switching equipment of the ATM network carries out the routing of each packet, or cell, on the basis of one or other (or both) of the VPI-VCI identifiers read from its header.

According to the applicable standards (ITU-T Recommendation I.361), the VCI is composed of $L_c=16$ bits, and the VPI is composed of $L_p=8$ bits at a user-network interface (UNI) and of $L_p=12$ bits at a network node interface (NNI). ITU-T Recommendation I.361 further prescribes, in paragraphs 2.2.3 and 2.3.2, that:

the bits of the VPI field that are used be contiguous;

the bits of the VPI field that are used be the least significant bits of the VPI field (starting from bit 5 of byte 2 of the cell header);

the bits of the VCI field that are used be contiguous;

the bits of the VCI field that are used be the least significant bits of the VCI field (starting from bit 5 of byte 4 of the cell header);

the non-assigned bits, that is to say those not used by the user or by the network in the 28-bit routing field, be set to 0.

The coding of the VPI-VCI pairs permits the differentiation of $2^{28}$, i.e. more than two hundred and sixty million virtual connections within each physical link. In practice, operators only use a much smaller number of virtual connections (typically of the order of 4,000).

Since the cells pertaining to the established virtual connections reach the equipment of the network randomly and at a very high rate, this equipment must be capable, on the basis of the VPI-VCI pairs read from the header of the cells, of very rapidly associating data with cells so as to adopt an appropriate response.

The simplest way of doing this would be to use a random access memory (RAM) where the data would be stored at addresses specified by the VPI-VCI pairs. However, the cost of the memory with a 28-bit index would be prohibitive for a derisory return when only a few thousand virtual connections are active.

Another approach is to use a dichotomy search, requiring a search loop, whose execution time is logarithmic as a function of the number of records, in a table in which the records are ranked in increasing or decreasing order of the VPI-VCI keys. In the context of ATM network equipment, this approach requires extremely fast electronics.

It is also possible to envisage using, as in EP-A-0 600 683, associative or contents-addressable memories (CAM). This solution has the drawback of being bulky and very expensive.

Within the realm of computer programming, a hashing technique is commonly used for the fast lookup of translation tables, as for example for databases or language compilers (see Knuth: "The Art of Computer Programming", Vol. 3, Addison-Wesley 1973, pages 506–542). This technique relies on the use of a hash function which randomly reduces the long access key into a shorter code, termed the H code. The purpose of this random function is to spread the H codes evenly over a reduced random access range. One example, derived from the cyclic code technique, of a usable function relies on polynomial division (see R. Jain: "A Comparison of Hashing Schemes for Address Lookup in Computer Networks", IEEE Trans. on Communications, Vol. 40, No. 10, October 1992, pages 1570–1573). Conflicts arise when the same H code is associated with several different access keys. These conflicts are resolved by a routine for searching through secondary overflow strings, which makes it possible to retain a very short mean execution time for the search. However, as noted in the aforesaid work by Knuth (page 540), hashing methods are only efficient on average, and the search time may be very long in unfavourable cases. This is due to the fact that the duration of a search through the secondary strings in the case of conflict is not bounded. These methods therefore appear to be unusable for the problem of the real-time association of data with ATM cells, since the execution time for the search must remain less than a cell time in order for the bit rate specifications to be complied with.

An object of the present invention is to propose an efficient and economic search procedure for associating data with ATM cells.

SUMMARY OF THE INVENTION

The invention proposes a method for associating data with ATM cells reaching an item of ATM network equipment via virtual connections. The process comprises, when establishing each of the virtual connections, the adoption of a pair of identifiers comprising a virtual path identifier of $L_p$ bits and a virtual channel identifier of $L_c$ bits, and the storage, in a table of the item of equipment, of data relating to said virtual connection in relation to its identifier pair. The method further comprises, at the arrival of each ATM cell whose header includes the identifier pair of one of the virtual connections, the reading from the table of data relating to said virtual connection. According to the invention, the table includes $p.2^m$ storage areas organized as $2^m$ rows and p columns, m and p being integers at least equal to 1, and the data relating to a virtual connection are stored in an area of the table whose row is labelled by an m-bit index calculated by applying a systematic cyclic code, the generating polynomial of which is of degree m, to a binary word of L bits ($L \leq L_p + L_c$) extracted from a sequence of $L_p + L_c$ bits which consists of the bits of one of the identifiers of the pair adopted in respect of said virtual connection, arranged in order of decreasing significance, followed by the bits of the other identifier of said pair, arranged in order of increasing significance.

The calculation of the index by means of a systematic cyclic code is comparable to a hashing function. However, the two-dimensional organization of the table makes it possible to bound the execution time for a search. It is not organized as a dynamic overflow table as in the software hashing technique. If p pairs VPI-VCI having the same index are already active and if a (p+1)th pair (VPI-VCI) giving rise to the same index happens to be envisaged in respect of a new virtual connection to be established, then this (p+1)th pair will be rejected. An appropriate dialogue with the item of equipment located at the other end of the virtual connection will then enable another pair to be chosen. The probability of occurrence of such a rejection can be made very small through appropriate dimensioning of the table.

Moreover, in a large number of cases no conflict at all will occur. The ordering of the bits of the VPI and VCI identifiers makes it sufficient to take p=1 for no conflict to arise up to a number of established connections equal to $2^m$ when the assigning of these identifiers obeys the rules stated in paragraphs 2.2.3 and 2.3.2 of ITU-T Recommendation I.361. This absence of conflicts results from the properties of the cyclic codes.

The table may also be composed of $p=2^s$ columns, with $s \geq 1$. The data relating to a virtual connection may then be stored without any risk of conflict (up to $2^{m+s}$ connections if the rules of ITU-T Recommendation I.361 are complied with) in an area of the table whose column is labelled by an index defined by s bits with specified positions of the identifier pair of this connection. These s bits (typically s=1 or 2) make it possible to distinguish between the sets of pairs of identifiers managed by the two ends of the connection.

In cases where the item of equipment is installed in a network which includes equipment which does not manage the VPI-VCI's in accordance with the standard, it may nevertheless still be of benefit to overdimension the table (p>1 or $p>2^s$) so as to make the risk of conflicts between randomly assigned VPI-VCI pairs very small. Even with this overdimensioning, a reasonably sized memory (a few tens of thousands of storage areas instead of $2^{28}$ in cases of straightforward use of a RAM memory) is still possible.

Cyclic codes which are particularly advantageous in calculating the m-bit indices are the Fire codes, having generating polynomials G(X) of the form $G(X)=(1+X^q).P(X)$, where P(X) is a prime polynomial of degree r, and q and r are integers greater than 0 such that q+r=m and L+m is not larger than the least common multiple (LCM) of q and $2^r-1$.

In addition to the above properties, any risk of conflict is then avoided if the bits used to differentiate between the VPI-VCI's of the same physical link are included within two respective movable zones of $L_1$ bits and $L_2$ bits such that $L_1+L_2=q+1$, $L_1 \leq q$, and $L_1 \leq r$.

BRIEF DESCRIPTION OF THE DRAWINGS

FIG. 4 shows timing diagrams of the operation of the means of FIG. 1.

DESCRIPTION OF PREFERRED EMBODIMENTS

In the description below, the invention is illustrated in an example of an application in an ATM switch. In particular, the case is considered in which the data which are to be associated with each incoming ATM cell consist of a connection identity, denoted Id_Cx, used by the switch to accomplish the required tasks on the cells belonging to a virtual connection. This internal identity Id_Cx is inserted in front of the contents of the ATM cell (header +data) in a "capsule" format peculiar to the switch. A capsule can be composed of the identity Id_Cx followed by the contents of the cell.

An example of an ATM switch which utilizes such a capsule format is described in detail in EP-A-0 735 727.

The internal identity Id_Cx serves as a pointer into random access memory (RAM) arrays of the switch. To accomplish a given function on a cell (such as routing in the switching matrices, translating VPI-VCI fields, monitoring bit rates relative to the peak bit rates or mean bit rates negotiated between the operator and the users, etc.), the switch reads the pertinent parameters (routing tags, new values of the VPI-VCI's, negotiated bit rate values etc.) from one of the RAM arrays at an address pointed at by the identity Id_Cx present in front of the cell at the start of the capsule. The identity Id_Cx contains far fewer bits than the VPI-VCI pair (for example 12 bits instead of 28 bits), so that the RAM arrays can consist of cheap, common-sized memory planes.

Of course, it would also be possible for the data associated with the cells in accordance with the invention to consist directly of the equipment operating parameters rather than of intermediate pointers into RAM arrays containing these parameters, especially if the item of equipment within which the invention is implemented is relatively uncomplex and hence does not require too large a number of such parameters.

Figure 1:
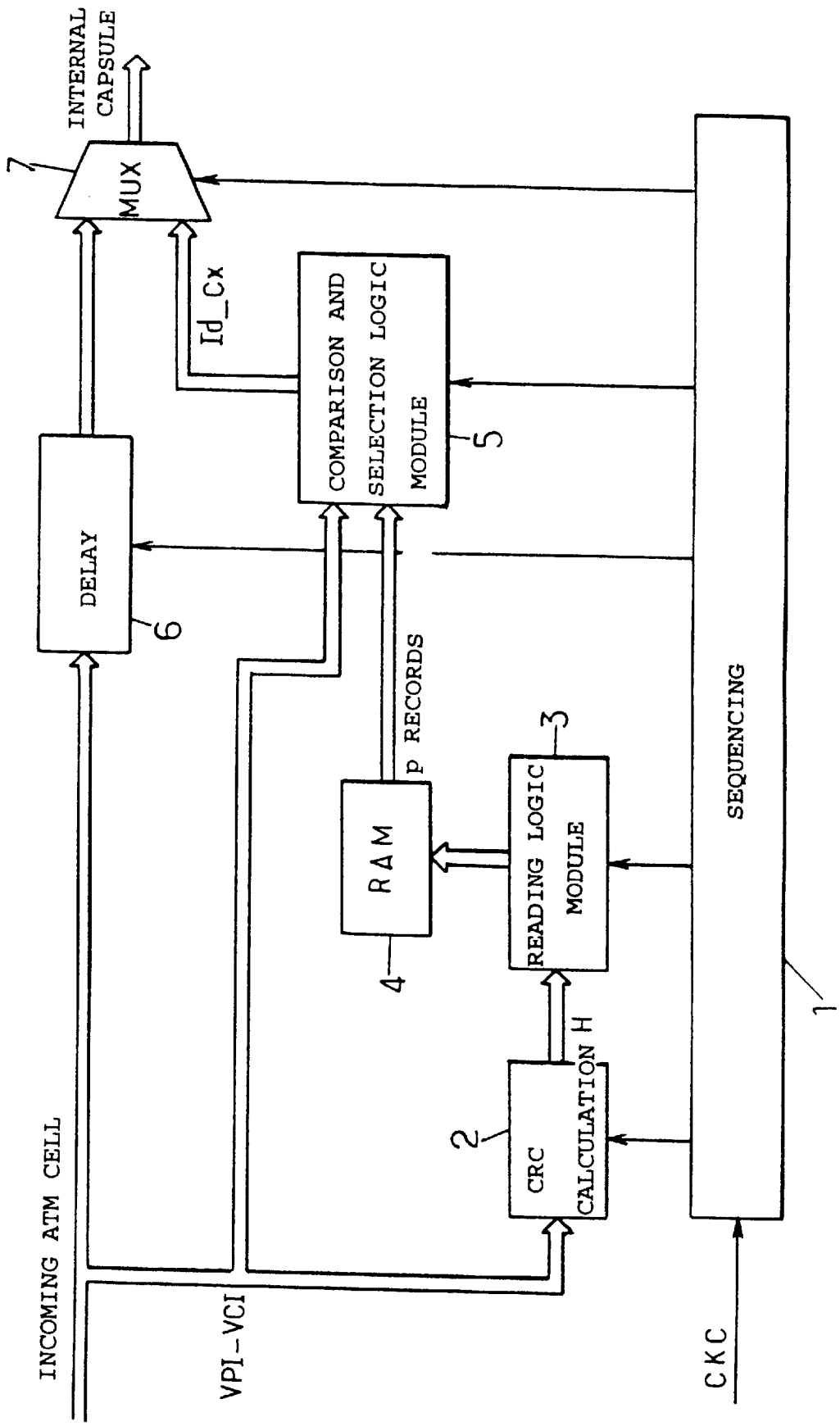
FIG. 1 is a block diagram of means employed to implement the invention in an ATM switch.

FIG. 1 shows means which can be used to associate the identities Id_Cx with ATM cells as they reach a switch, and to insert these identities at the start of the corresponding capsules. These means are supervised by a timing module 1 for sequencing the operations under the control of the central processor of the switch. This module 1 receives the cell-clock signal CKC marking the starts of the cells successively reaching the input of the switch over a physical link, so as to trigger the required operations in due course. The units 2, 3, 4 and 5 produce, at the arrival of each cell, the internal identity Id_Cx of the connection to which this cell pertains in a time less than the period of the clock signal CKC. A unit 6 delays the incoming cell by a corresponding time before delivering it to a multiplexer 7 whose other input receives the internal identity Id_Cx. The multiplexer 7 delivers the capsule consisting of the cell preceded by the identity associated in accordance with the internal format of the switch.

Figure 2:
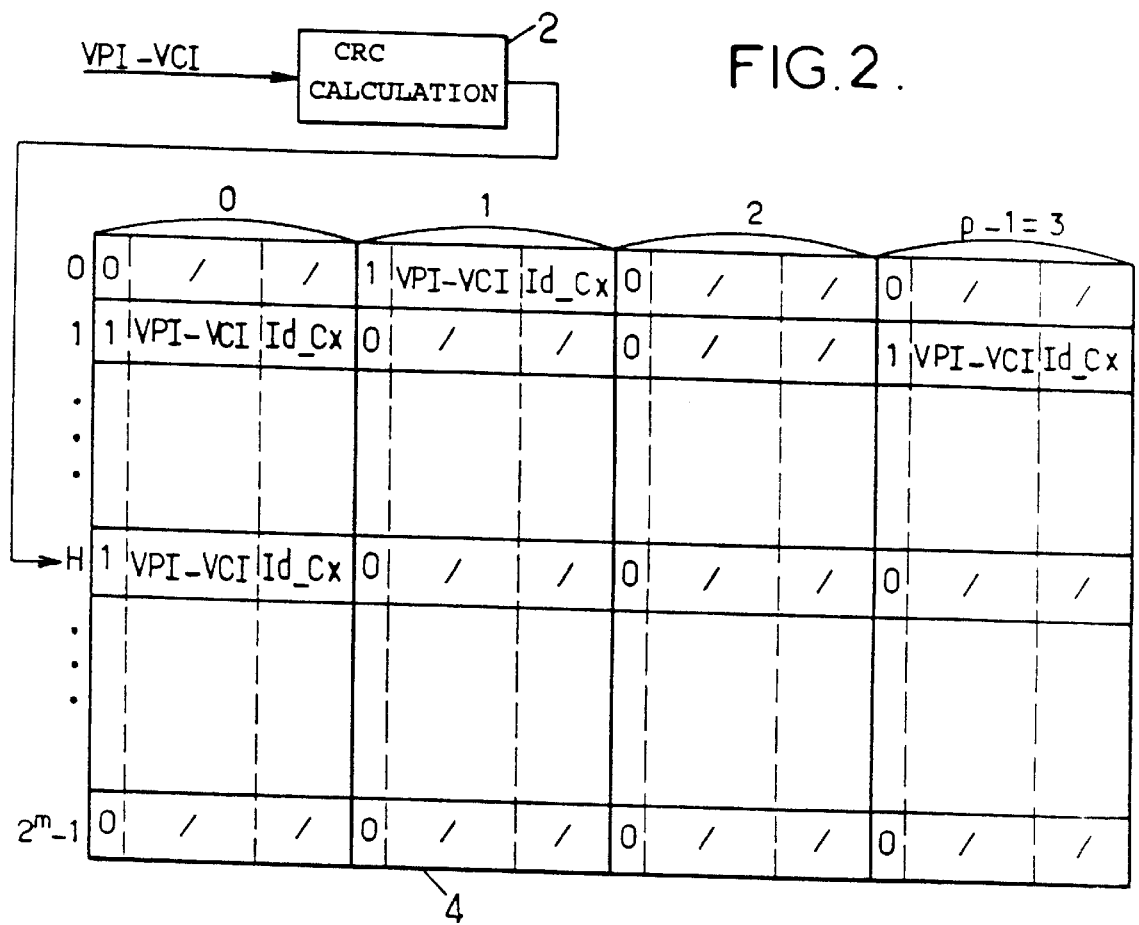
FIG. 2 is a diagram illustrating the structure of the data storage table.

The identities Id_Cx are stored in relationship with the corresponding VPI-VCI pairs in a RAM memory unit 4 organized as a two-dimensional table as illustrated in FIG. 2.

The table 4 comprises $p.2^m$ storage areas organized as $2^m$ rows indexed from 0 to $2^m-1$, and p columns indexed from 0 to p-1 (p=4 in the particular case represented in FIG. 2). Each area is composed of three locations:

the first includes a bit x indicating by the value x=1 the fact that the area contains a valid record, i.e. one which relates to an established virtual connection, and by the value x=0 the absence of such a valid record;

the second, of $L_p+L_c=28$ bits (the case of an NNI interface), contains the identifier pair VPI-VCI designating the virtual connection if x=1;

the third contains the internal identity Id_Cx of the virtual connection if x=1.

The index H of the row of the table 4 which includes the area in which the data relating to a virtual connection are stored is obtained via the unit 2 on the basis of the VPI-VCI pair for this connection, by a CRC ("cyclic redundancy checksum") calculation as is commonly used in the realm of error detector coding.

Conventionally (see "Theorie et Technique de la Transmission de Données" by Clavier et al., published by Masson 1979), the systematic cyclic coding of a binary word of L bits $i_{L-1}i_{L-2}\ldots i_1i_0$, which is represented by a polynomial $i(X)=i_{L-1}X^{L-1}+i_{L-2}X^{L-2}+\ldots+i_1X+i_0$, consists in calculating the remainder of the Euclidian division of the polynomial $X^m i(X)$ by a generating polynomial $G(X)$ of degree m, the additions being understood as bit-by-bit EXCLUSIVE OR operations. The m binary coefficients of the remainder polynomial constitute the CRC which is used here as row index H. Such Euclidian divisions are carried out in a simple and very fast manner by conventional calculating circuits based on m-stage shift registers.

Figure 3:
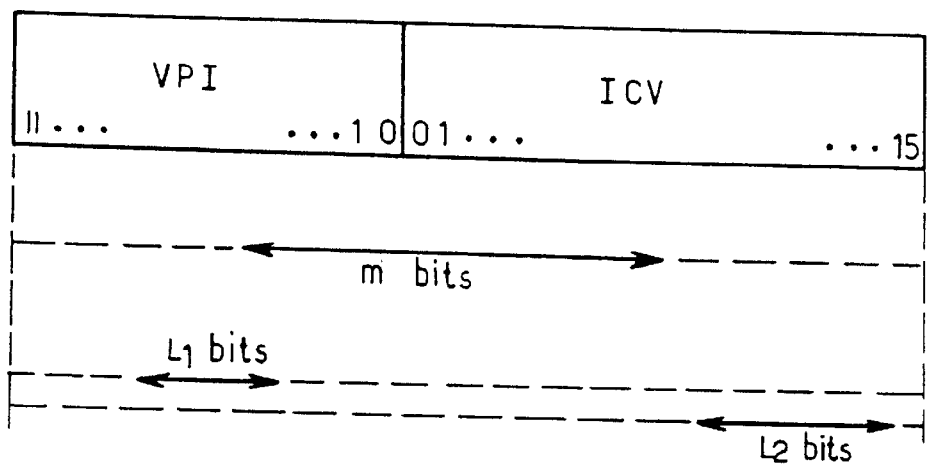
FIG. 3 is a diagram illustrating the construction of the row labelling indices from the VPI-VCI pairs.

According to the invention, the binary word subjected to the cyclic coding is made up of L consecutive bits extracted from a sequence of $L_p+L_c$ bits which consists of the bits of one of the identifiers of the VPI-VCI pair, arranged in order of decreasing significance, followed by the bits of the other identifier of the VPI-VCI pair, arranged in order of increasing significance. FIG. 3 thus shows the sequence VPI-ICV, the first $L_p$=12 bits of which are those of the VPI in order of decreasing significance, and the last $L_c$=16 bits of which are those of the VCI in order of increasing significance. The case is first considered in which $L=L_p+L_c$, i.e. the complete sequence VPI-ICV is subjected to the systematic cyclic coding.

The way in which the row indices H are calculated guarantees that two sequences VPI-ICV which differ only by bits lying within any zone of m consecutive bits do not give rise to the same index H. This results from a well-known property of cyclic codes according to which the transmission of the CRC as redundant information appended to the binary word of L bits makes it possible to detect errors located in a zone of length less than or equal to the degree of the generating polynomial $G(X)$.

As a consequence, when the VPI-VCI pairs are allocated to the virtual connections in accordance with the rules of ITU-T Recommendation I.361 recalled in the introduction, up to $2^m$ different connections can be established, the data of which will be stored in different rows of the table 4.

If it is stipulated that the switch must support up to N virtual connections, the table 4 can then be dimensioned such that $2^m \geq N$ and p=1. Another possibility is to dimension the table 4 such that $p=2^s$ and $2^{m+s} \geq N$ with $s \geq 1$, s bits with predetermined positions of the sequence VPI-ICV then serving as index of the column which includes the relevant storage area (the case p=1 corresponds to s=0). If it is certain that the VPI-VCIs will always be allocated in accordance with the standard, in this case it is not even necessary that locations for receiving the bit x and the VPI-VCI pair be provided in the storage areas of the table 4 since an unambiguous read address is produced by calculating CRC and, if $s \geq 1$, by labelling the columns with the s column indexing bits.

The size of the table 4 is imposed by the potential number of connections and not by the length of the VPI-VCI field. It should be noted that, by virtue of the mobility of the m-bit zone represented in FIG. 3, absence of conflict is obtained for the physical links provided in order to support a fairly large number of virtual paths and relatively few virtual channels per virtual path and also for the physical links provided in order to support relatively few virtual paths and a fairly large number of virtual channels per virtual path.

Although the present invention avails itself of the rules of Recommendation I.361, it is advantageous to provide adaptations whereby situations which do not follow this Recommendation can be taken into account. Indeed, the invention may be implemented with equipment pre-dating those rules. Moreover, the possibility cannot be excluded that those rules may be modified or rendered less constraining in the future.

The example mentioned above, in which $L=L_p+L_c-s$ with $s \geq 1$, thus makes it possible to reserve s bits of the VPI-VCI pair (for example the most significant bit of VPI and/or that of VCI) to discriminate between the pairs VPI-VCI managed by one or other of the ends of the virtual connection. The data relating to the VPI-VCI's managed by each end will then be stored in different rows of table 4.

Another adaptation, illustrated by FIGS. 1 and 2, consists in providing the table 4 with a larger number p of columns than the strict minimum, so as to make it possible efficiently to take into account situations in which the VPI-VCI's are allocated randomly. When a cell whose header includes a pair VPI-VCI arrives at the switch, the row index is calculated and the various areas of the row are examined in order to find an area whose first location contains a bit x=1 and whose second location contains the VPI-VCI pair in question. The internal identity Id_Cx may be read from this area.

The probability $B(N,m,p)$ of overflow in a row of table 4, or blocking factor, is $B(N,m,p)=1-Pr(0)-Pr(1)-\ldots-Pr(p)$, where $Pr(i)$ is the probability that the same index H is used i times. If the pairs VPI-VCI are chosen independently of the structure of the cyclic code employed to calculate the row indices, the law $Pr(.)$ can be approximated by a Poisson law, $Pr(i) \approx e^{-a}(a^i/i!)$, where $a=N/2^m$ is the density of use of the indices H. Thus, if p=6 columns are provided in the table 4, up to $N=2^{m-1}$ virtual connections can be accepted with a blocking factor $B(2^{m-1},m,6) \approx 0.0000010$. If the number of virtual connections rises to $N=2^m$, the blocking factor remains very small: $B(2^m,m,6) \approx 0.000083$.

When a blockage occurs, it may be observed as soon as the relevant virtual connection is established. The switch can then reject the choice of the VPI-VCI pair, as allowed by the ATM signalling protocols. The switch chooses another pair or, if management of the VPI-VCI is under the control of the other end of the connection, the switch notifies it of the rejection, thus leading to a new choice with once again a very small blocking probability.

In the example illustrated in FIG. 1, the CRC calculation unit 2 extracts the VPI-VCI identity from the header of each cell entering on a physical link of the switch, and calculates the row index H on the basis of the complete sequence VPI-ICV ($L=L_p+L_c$). This corresponds to the first three lines of FIG. 4. This index H is validated in a register of a logic module 3 for reading the RAM memory 4. This logic module 3 is designed so that the records contained in the p areas of the row H are presented on the data port of the memory 4 to a comparison and selection logic module 5. This logic module 5 discards the records from the areas whose first location contains x=0. For the areas of the row which are such that x=1, the logic module 5 compares the respective contents of the second locations with the VPI-VCI pair present in the header of the incoming cell. The area for which x=1 and the second location containing the right pair VPI-VCI is finally selected, and the identity Id_Cx read from the third location of this area is validated in an output register of the logic module 5. This output register is linked to the multiplexer 7 so as to produce the identity Id_Cx in good time (last three lines of FIG. 4). Depending on the speed of the components of the logic module 5, the comparisons, as well as the reading from the memory 4, can be formed either sequentially for the p records or partially or completely in parallel. As illustrated by the first and the last line of FIG. 4, it has been possible to insert the identity Id_Cx in front of the contents of the cell in a time less than the period of the cell clock CKC.

Other accesses to the RAM memory 4 are possible in the periods labelled in the sixth line of FIG. 4. These periods are used to update the contents of the table, especially during the establishing and closing of virtual connections. Since these operations are not subject to the same speed constraints as the insertion of the data in front of the incoming cells, they can be executed in a non-critical manner over a number of periods.

At the establishment of a virtual connection, a pair VPI-VCI is first preselected, either by the switch rigged in accordance with the invention or by another item of equipment of the ATM network. A CRC calculation is performed on the basis of the preselected pair so as to obtain a row index H. If the bits x contained in the first locations of the p areas of the row H are all at 1, this row no longer contains any available area, and the preselected pair VPI-VCI is rejected, thus leading to the preselection of another one. If one or more areas of the row contain x=0 in their first locations, this area, or one of these areas (for example the first), is selected and the preselected pair is adopted. The value of the bit x contained in the first location of the selected area is changed (x=1), the VPI-VCI pair adopted is written to the second location of this area, and its third location receives the corresponding identity Id__Cx which is allocated to it by the central processor of the switch.

When a virtual connection designated by a pair VPI-VCI is being closed, the row index H is obtained through a CRC calculation, the area of the row thus indexed whose first location contains x=1 and whose second location contains the VPI-VCI pair in question is identified, and the value of the bit x of this area is changed (x=0).

The generating polynomial G(X) of degree m employed in the CRC calculations is advantageously of the form $G(X)=(1+X^q) \cdot P(X)$, where P(X) is a prime polynomial of degree r=m−q, L+m not being larger than the LCM of q and of $2^r-1$. The row indices are then generated by means of a Fire code, this proving to be convenient for the identifiers VPI and VCI managed in pairs. In addition to the previously cited properties, the Fire code makes it possible to detect errors located in two movable zones of $L_1$ bits and $L_2$ bits such as $L_1+L_2=q+1$ and $L_1 \leq \min(q,r)$, as illustrated in the lower part of FIG. 4.

Thus, if the bit zones used for the VPI-VCIs are not limited to the least significant bits (the case of Recommendation I.361), but are on the contrary any zones of length q for one of the identifiers and r for the other, the CRC calculation will make it possible to produce up to $2^{q+r}$ entirely distinct row indices. A table with $p=2^s$ columns ($s \geq 0$) can then accept up to $2^{q+r+s}$ virtual connections without blockage.

As a numerical example, the case of a table structured as illustrated in FIG. 2 with m=13 and p=6 is considered. The generating polynomial of the cyclic code is for example $G(X)=(1+X^9)(X^{4+X}+1)$, corresponding to a Fire code with q=9 and r=4 ($L_1 \leq 4$, $L_2=10-L_1$). With this numerical example:

if the bits employed for the allocation of the VPI-VCIs are distributed in a random manner over all the 28 bits, the table exhibits a blocking factor of only 0.0000010 for 4096 connections, and 0.000083 for 8192 connections, which is still acceptable. With a two-try allocation routine, this blocking factor becomes practically zero; let us assume that 15 bits are used to choose the VPI-VCI's, with a zone of m=13 consecutive bits of arbitrary position, comprising the least significant bits of VPI and VCI, and s=2 arbitrary bits. Table 4 will then not exhibit any overflow (it would even suffice to have p=4). If the positions of the s bits are known to the item of equipment, these s bits can be used as column index in the manner described earlier, storage of the VPI-VCIs in the table 4 then being ineffectual, as is the comparison and selection logic module 5. If the item of equipment does not know the positions of the s bits, storage of the VPI-VCI's in the table 4 and the comparison and selection mechanism replace the indexing of the columns to guarantee the absence of overflows;

if the zones of VPI and of VCI which are used do not comprise the least significant bits but are any zones, with a configuration of $L_1=4$ consecutive VPI bits and $L_2=6$ consecutive VCI bits (or vice versa), up to 1024 distinct H indices are defined. With s=2 other bits with arbitrary positions out of the 28 VPI-VCI bits, 4096 connections can be guaranteed without blockage.

It should be noted that the number L of bits of the binary word subjected to the cyclic coding can in certain cases be smaller than the number $L_p+L_c$ of bits of the VPI-ICV sequence without the performance of the process being affected thereby. Thus, in the above example in which $L_c=16$, $L_p=12$ and m=13, the three most significant bits of the VCI can be excluded from the VPI-ICV sequence so as to form the word subjected to the cyclic coding, without losing the property of guaranteeing $2^m$ different row indices for $2^m$ pairs VPI-VCI allocated in accordance with Recommendation I.361. In the case of a random allocation, the omission of a few bits ($L<L_p+L_c$) leads to only a minimal number of blockages if the number of columns of the table 4 is chosen suitably.

What is claimed is:

1. A method for associating data with ATM cells reaching an item of ATM network equipment via virtual connections, comprising the following steps when establishing each of the virtual connections:

adopting a pair of identifiers for said virtual connection, comprising a virtual path identifier of $L_p$ bits and a virtual channel identifier of $L_c$ bits; and storing, in a table of the item of equipment, data relating to said virtual connection in relation to the identifier pair thereof, the method further comprising, at the arrival of each ATM cell having a header including the identifier pair of one of the virtual connections, the step of reading from the table data relating to said one of the virtual connections, wherein the table includes $p.2^m$ storage areas organized as $2^m$ rows and p columns, m and p being integers at least equal to 1, and wherein the data relating to a virtual connection are stored in an area of the table located in a row labelled by an m-bit index calculated by applying a systematic cyclic code, having a generating polynomial of degree m, to a binary word extracted from a sequence of $L_p+L_c$ bits which consists of the bits of one of the identifiers of the pair adopted in respect of said virtual connection, arranged in order of decreasing significance, followed by the bits of the other identifier of said pair, arranged in order of increasing significance.

2. A method according to claim 1, wherein the cyclic code has a generating polynomial G(X) of the form $G(X)=(1+X^q).P(X)$, where P(X) is a prime polynomial of degree r, and q and r are integers greater than 0 such that q+r=m and L+m is not larger than the least common multiple of q and of $2^r-1$, L denoting the number of bits of said binary word.

3. A method according to claim 2, wherein $L \leq 28$, q=9 and r=4.

4. A method according to claim 1, wherein each storage area of the table includes a first location containing a bit having a first value it said area contains data relating to an established virtual connection, and a second value if said area does not contain data relating to an established virtual connection.

5. A method according to claim 4, wherein each storage area of the table includes a second location for receiving the identifier pair of a virtual connection to which data stored in said area relate.

6. A method according to claim 5, wherein the number p of columns of the table is larger than 1, and comprising the following steps at the establishment of a virtual connection:

/a/ preselecting an identifier pair;

/b/ calculating the row index relating to the preselected pair;

/c/ returning to step /a/ if the bits contained in the respective first locations of the p areas of the row of the table labelled by the calculated index all have the first value;

/d/ adopting the preselected pair if a bit contained in the first location of at least one of the p areas of the row of the table labelled by the calculated index has the second value, and selecting such an area for the connection; and /e/ changing the value of the bit contained in the first location of the selected area, writing the identifier pair adopted to the second location of the selected area, and writing the data to be stored to the selected area.

7. A method according to claim 6, comprising the following steps at the arrival of each ATM cell having a header including the identifier pair of one of the virtual connections:

calculating the row index relating to the identifier pair included in the header of said cell; and reading the data stored in a storage area of the row labelled by the calculated index, the first location of which contains a bit having the first value and the second location of which contains an identifier pair which coincides with that included in the header of said cell.

8. A method according to claim 1, wherein the table includes a single column.

9. A method according to claim 1, wherein the number p of columns of the table is equal to $2^s$, s being an integer at least equal to 1, and wherein the data relating to a virtual connection are stored in an area of the table located in a column labelled by an index defined by s bits with predetermined positions of the identifier pair of said virtual connection.

* * * * *